(12) United States Patent
Gay

(10) Patent No.: US 6,423,264 B1
(45) Date of Patent: Jul. 23, 2002

(54) PROCESS FOR FORMING ROTATING ELECTROMAGNETS HAVING SOFT AND HARD MAGNETIC COMPONENTS

(75) Inventor: David Earl Gay, Pendleton, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/418,294

(22) Filed: Oct. 14, 1999

(51) Int. Cl.[7] .............................. H01F 1/03; H01F 7/06
(52) U.S. Cl. ........................ 264/611; 264/612; 419/10; 419/38; 29/602.1; 148/100
(58) Field of Search ............................ 264/611, 612; 419/10, 38; 29/602.1; 148/100; 156/89

(56) References Cited

U.S. PATENT DOCUMENTS

| | | | |
|---|---|---|---|
| 3,613,100 A | * 10/1971 | Kaufer et al. | |
| 5,221,503 A | 6/1993 | Ward et al. | ................. 264/104 |
| 5,405,574 A | 4/1995 | Chelluri et al. | ................. 419/47 |

* cited by examiner

Primary Examiner—Christopher A. Fiorilla
(74) Attorney, Agent, or Firm—Margaret A. Dobrowitsky

(57) ABSTRACT

A method of a manufacturing rotating electromagnetic component to have both soft and hard (permanent) magnet regions, in which powder technologies are used to net-shape mold the component. A soft magnet powder material and an insert or powder of a permanent magnet material are compacted to form a rotating electromagnetic body containing soft and hard magnet regions. A partial sintering operation is then performed on the body at a temperature of 1600° F. (about 870° C.) or less, preferably about 1400° F. to 1500° F. (about 760° C. and 830° C.), and most preferably at 1500° F. to at least partially fuse the soft magnet powder materials with the permanent magnet material. The soft powder component of the resulting electromagnetic body is sufficiently fused to exhibit mechanical properties comparable to a fully sintered body (i.e., sintered at 2050° F. (about 1120° C.) or more), but without degrading the magnetic properties of the hard magnet region.

20 Claims, 3 Drawing Sheets

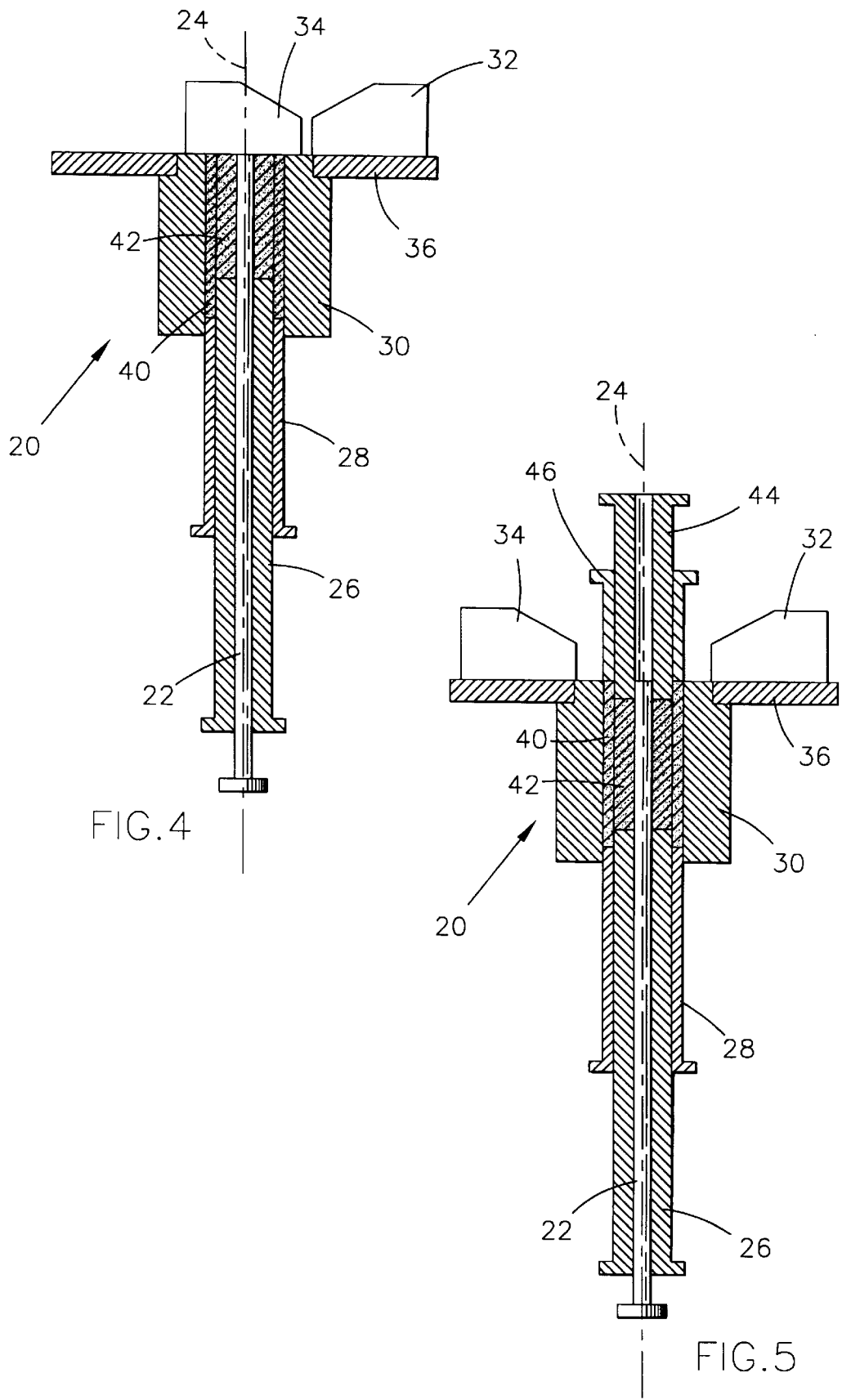

PROCESS FOR FORMING ROTATING ELECTROMAGNETS HAVING SOFT AND HARD MAGNETIC COMPONENTS

TECHNICAL FIELD

The present invention generally relates to rotating electromagnetic components, such as rotors for motors and generators. More particularly, this invention relates to a method using powder technologies to net-shape mold a rotating electromagnetic component having soft and permanent magnet core components.

BACKGROUND OF THE INVENTION

The use of powder metallurgy (P/M), and particularly iron and iron alloy powders, is known for forming magnets, including soft magnetic cores for transformers, inductors, .AC and DC motors, generators, and relays. An advantage to using powdered metals is that forming operations, such as compression molding, injection molding and sintering techniques, can be used to form intricate molded part configurations, such as magnetic cores, without the need to perform additional machining and piercing operations. As a result, the formed part is often substantially ready for use immediately after the forming operation. For rotating components such as rotors for AC and DC motors and generators, soft magnets can be sintered at temperatures of about 2050° F. (about 1120° C.) or more to achieve greater mechanical strength.

Certain electromagnetic applications require or benefit from a combination of soft iron magnets and "hard" permanent magnet, such as when permanent magnet regions are provided within a rotor to direct magnetic flux, yielding a more efficient rotor with higher outputs. A prominent example of a permanent magnet for such applications is based on compositions containing iron, a rare earth metal such as neodymium and/or praseodymium, and boron. Such permanent magnets contain, as an essential magnetic phase, grains of 2 tetragonal crystals in which the proportions of iron, neodymium and boron (for example) are exemplified by the empirical formula $Fe_{14}Nd_2B$. These magnet compositions and methods for making them are described in U.S. Pat. No. 4,802,931 to Croat. The grains of the magnetic phase are surrounded by a second phase that is typically rare earth-rich, e.g., neodymium-rich, as compared to the essential magnetic phase. Magnets based on such compositions are typically prepared by rapidly solidifying (such as by melt spinning) a melt of the composition to produce fine grained, magnetically isotropic platelets of ribbon-like fragments with an amorphous noncrystalline metallurgical structure. High coercivity permanent magnets may be formed from these isotropic particles by blending the fragments with a binder followed by compacting to form a "soft" magnetically isotropic magnet body. According to U.S. Pat. No. 4,782,367 to Lee, stronger magnets can be produced by hot pressing the magnet body to gain some magnetic anisotropy in the direction in which the magnet body was hot pressed, and still greater anisotropy is achieved by hot working the magnetic body. Finally, according to U.S. Pat. No. 4,8842,656 to Maines et al., Lee's anisotropic magnet body can be crushed to produce a powder suitable for forming anisotropic magnets by powder metallurgy methods.

A process limitation to the use of the above-described permanent magnet compositions is that heating above 1620° F. (about 882° C.) causes crystallization of the amorphous microstructure, resulting in the loss of the desired magnetic properties. As a result, in achieving a rotating electromagnetic component having both soft and permanent magnet core components, magnet bodies of only relatively weak mechanical strength have been produced; since the sintering (2050° F.) required for optimum strength of the soft core component is not possible without destroying the desired anisotropy of the hard core component. Consequently, in the past, rotating electromagnetic components having soft and permanent magnet core components have not been formed exclusively by powder metallurgy techniques, but instead have typically been formed by such methods as placing inserts of permanent magnet material in a sheet lamination stack of a soft magnet material. While capable of achieving desirable magnetic and mechanical properties, such components are costly in terms of materials and assembly.

In view of the above, it would be desirable if a powder metallurgy process were available that enabled the mass production of rotating electromagnetic components having both soft and permanent magnet core components, and which exhibit adequate mechanical strength for applications that require relatively high rotational speeds, as is often the case with AC and DC rotors of motors and generators.

SUMMARY OF THE INVENTION

The present invention is directed to a method for manufacturing a rotating electromagnetic component to have both soft and hard (permanent) magnet regions, and in which powder technologies are used to net-shape mold the component. The invention employs a powder of a soft magnet material and either a powder or insert of a hard magnet material, and then performs a partial sintering operation that has been determined to effectively bind the powder (or powders) together without degrading the magnetic properties of the hard magnet material.

The invention generally entails the steps of compacting a soft magnet powder material and an insert or powder of a permanent magnet material to form a rotating electromagnetic body containing soft and hard magnet regions. The partial sintering operation is then performed on the rotating electromagnetic body at a temperature of 1600° F. (about 870° C.) or less, preferably about 1400° F. to 1500° F. (about 760° C. to about 830° C.), and most preferably at 1500° F. or slightly below to at least partially fuse the soft magnet powder materials with the permanent magnet material. According to this invention, the soft powder component of the resulting electromagnetic body is sufficiently fused to exhibit mechanical properties comparable to a fully sintered body (i.e., sintered at 2050° F. (about 1120° C.) or more), but without degrading the magnetic properties of the hard magnet region. The result is a process that enables the mass production of rotating electromagnetic components having both soft and permanent magnet core components, and which exhibit adequate mechanical strength for applications that require relatively high rotational speeds, as is often the case with AC and DC rotors of motors and generators.

Other objects and advantages of this invention will be better appreciated from the following detailed description.

BRIEF DESCRIPTION OF THE DRAWINGS

FIGS. 2 through 7 depict a process for forming the permanent magnet rotor assembly of FIG. 1 according to this invention.

DESCRIPTION OF THE PREFERRED EMBODIMENT

Figure 1:
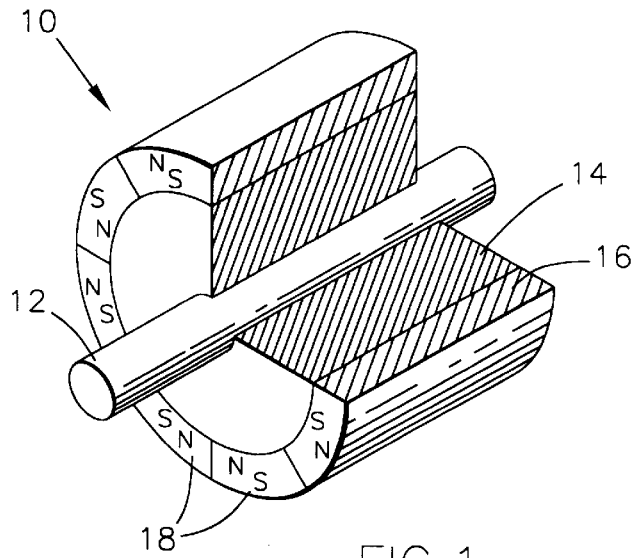
FIG. 1 is a sectioned perspective view of a permanent magnet rotor assembly manufactured according to this invention.

FIG. 1 represents a permanent magnet rotor assembly 10 manufactured in accordance with the present invention. The assembly 10 generally includes a central shaft 12, an inner ferromagnetic core 14, and an outer permanent magnet shell 16. According to this invention, the ferromagnetic core 14 is formed of a compacted soft magnet powder, while the permanent magnet shell 16 may be formed of compacted hard magnet powder or one or more preformed inserts of a hard magnet material. In the course of manufacturing the assembly 10, the materials of the core 14 and shell 16 are fused to form a unitary structure, with the shell 16 being effectively bonded to the core 14. In addition, the shaft 12 may be installed sufficiently early in the manufacturing process so that the core 14 is firmly secured to the shaft 12 by the same operation that fuses the materials of the core 14 and shell 16. Alternatively, the shaft 12 may be press fit into a central opening formed in the ferromagnetic core 14. Following compression and fusing of the core 14 and shell 16, the rotor assembly 10 is placed in a magnetizing fixture (not shown) and subjected to a strong magnetic field. The field aligns magnetic regimes within the magnetizable shell 16 according to a predetermined pattern, forming permanent magnet poles 18 in the shell 16 as represented in FIG. 1.

FIGS. 2 through 7 represent the embodiment of the invention in which both the core 14 and shell 16 are formed of powder materials. Suitable materials for the core 14 are "soft" magnet materials such as iron and its alloys, nickel and its alloys, cobalt and its alloys, iron-silicon alloys, iron-phosphorus alloys, iron-silicon-aluminum alloys, ferrites and magnetic stainless steel alloys. Suitable permanent ("hard") magnet materials include ferrites, iron-rare earth metal alloys, samarium alloys and ceramic materials. Preferred permanent magnet materials are neodymium-iron-boron compositions available from Magnequench International. As known in the art, these materials are characterized by an amorphous noncrystalline metallurgical structure and exhibit magnetic anisotropy. However, heating these materials above 1600° F. (about 870° C.) destroys their amorphous structure, and therefore also the desirable magnet properties made possible by the amorphous structure. For this reason, in the past, rotors and other rotating electromagnetic bodies that require sintering to achieve sufficient strength for high speed operation have not been formed of sintered powder materials such as Nd—Fe—B compositions as well as other hard magnet materials.

A suitable average particle size range for the powders is about 5 to about 1000 micrometers, with a preferred average size being about 100 to 200 micrometers. To facilitate processing and maximize density after compaction, the individual particles of the soft and hard powders are preferably encapsulated with a polymeric coating material that burns off cleanly during the partial sintering operation of this invention. Suitable coating materials for this purpose include poly(alkylene carbonates), polypropylene oxide (PPO) polymer systems such as NORYL® from General Electric, waxes, low melting polymers, nylons, polyetherimides such as ULTEM® from General Electric, epoxies, phenolics, polyesters and silicones. These coating materials are preferably deposited on the powder particles to form a substantially uniform encapsulating layer, which may constitute about 0.1 to about 1 weight percent of each particle, preferably about 0.20 to about 0.50 weight percent of each particle. To further promote densities and eliminate the requirement for external die wall spray lubricants, the powders can be admixed with lubricants such as stearates, fluorocarbons, waxes, low-melting polymers and synthetic waxes such as ACRAWAX available from Lonza, Inc.

Suitable methods for encapsulating the powders are well known, and include solution blending, wet blending and mechanical mixing techniques, and Wurster-type batch coating processes such as those described in U.S. Pat. Nos. 2,648,609 and 3,253,944. During the partial sintering process of this invention, the polymeric coatings and any lubricants burn off, leaving only the fused magnet particles.

As represented in FIGS. 2 through 7, a suitable manufacturing process for the rotor assembly 10 is based on an apparatus and method disclosed in U.S. Pat. No. 5,221,503 to Ward et al., commonly assigned with the present invention. In the Figures, a punch and die apparatus 20 is shown to have a central core rod 22 aligned along a longitudinal axis 24 of a heated die casing 30. An annular inner punch 26 is slidably disposed about the core rod 22 while an annular outer punch 28 is slidably disposed between the inner punch element 26 and the heated die casing 30. A pair of powder dispensers 32 and 34 are provided on a die table 36 that is located at an upper end of the die casing 30. The powder dispensers 32 and 34 are loaded with the soft and hard magnet powders, respectively, required for the core 14 and shell 16. Each dispenser 32 and 34 is adapted to dispense its powder into one of the cavities formed when the inner and outer punches 26 and 28 are retracted, as will be more fully explained below. The die casing 30 and any other component of the apparatus 20 may be vibrated to enhance the filling of the cavities.

Figure 2:
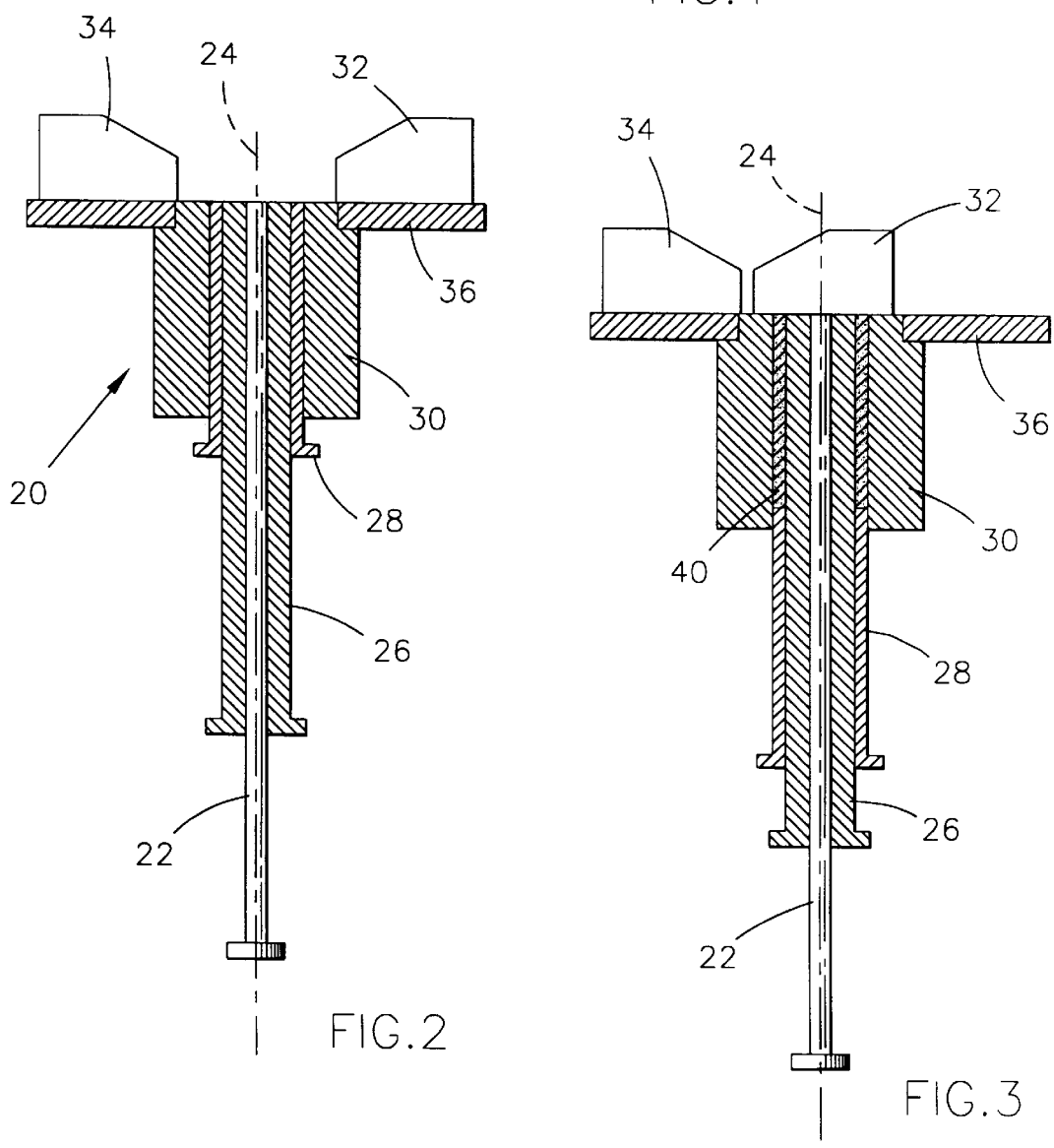
Figure 3:
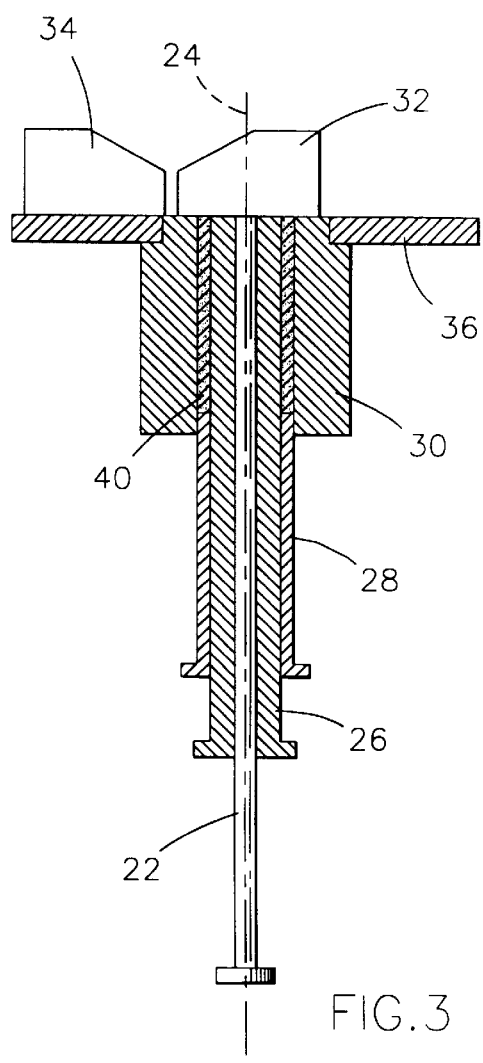

As shown in FIG. 2, the inner and outer punches 26 and 28 are initially cycled to their uppermost positions to expel any foreign matter from the die casing 30. The outer punch 28 is then retracted, as shown in FIG. 3, to form a permanent magnet cavity 40 between the heated die casing 30 and the outer diameter of the inner punch 26. The dispenser 32 is then moved from its base position to the cavity 40, and thereafter fills the cavity 40 with the hard magnet powder, as indicated in FIG. 3. The dispenser 32 then returned to its base position, and the second dispenser 34 is positioned above the punches 26 and 28. The inner punch 26 is then retracted, as seen in FIG. 4, to form a core cavity 42, which is immediately backfilled with the soft magnet powder from the dispenser 34. The core cavity 42 is shown as being shorter than the permanent magnet cavity 40 due to differences in the apparent densities of the soft and hard magnet powders.

Figure 6:
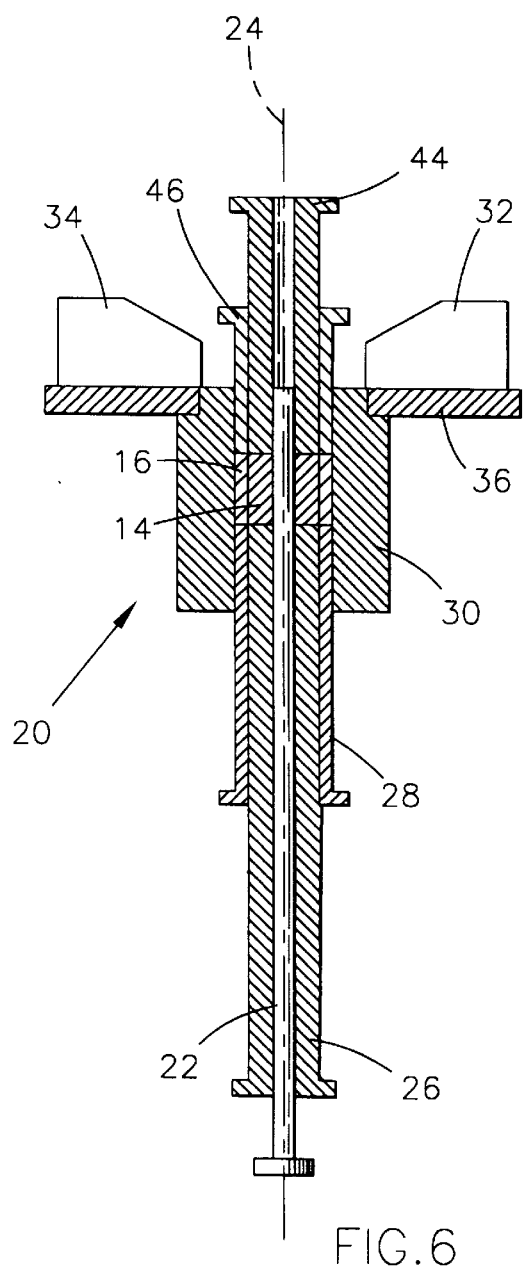
Figure 7:
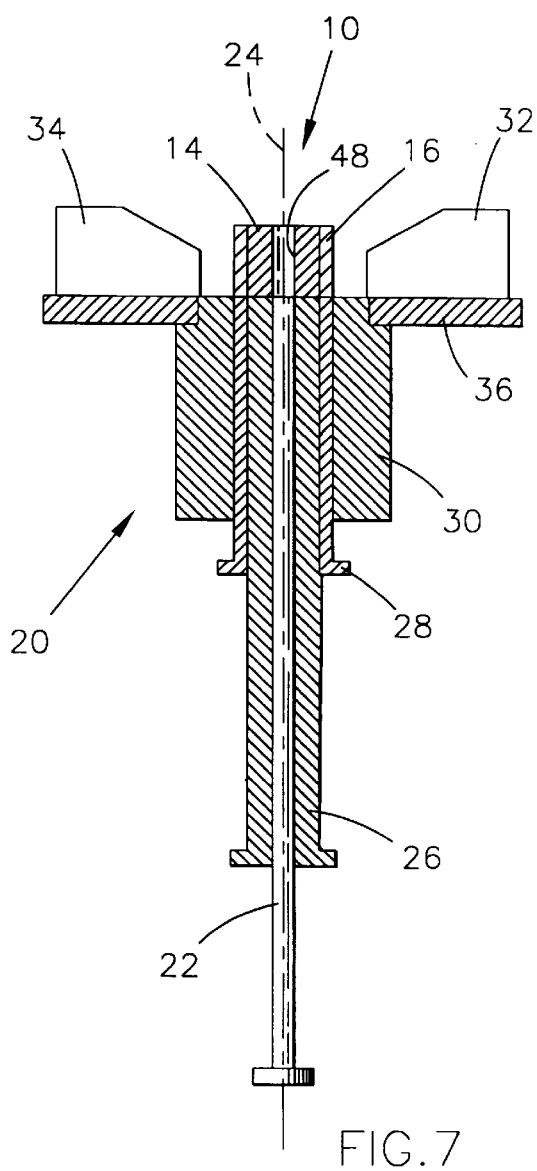

After filling the core cavity 42, the dispenser 34 is returned to its base position as shown in FIG. 5, and the inner punch 26 is further retracted to axially center the core cavity 42 within the permanent magnet cavity 40. At the same time, a pair of upper punches 44 and 46 are positioned to axially oppose the punches 26 and 28 in preparation for compaction of the soft and hard magnet powders. As depicted in FIG. 6, compaction of the soft and hard magnet powders is performed by forcing the punches 26 and 28 and opposing punches 44 and 46 toward each other. In combination with heating the die casing 30 to a suitable temperature (e.g., about 65° C. to about 285° C.), compacting the powders causes their polymeric coating materials to fuse, forming a bond between the core 14 and shell 16 and the powders within. As shown in FIG. 7, the upper punches 44 and 46 can be raised after the compaction step, and the inner and outer punches 26 and 28 are raised to eject the rotor assembly 10 out of the punch and die apparatus 20.

In the illustrated embodiment, the core rod 22 defines a central opening 48 in the core 14, and the manufacture of the rotor assembly 10 is completed with the insertion of the shaft 12 through the opening 48 to yield the rotor configuration of FIG. 1. Alternatively, prior to the compacting step, the core rod 22 could be lowered to define a third cavity corresponding to the opening 48, and then the shaft 12 inserted in the third cavity so that the soft magnet powder material is compacted around the shaft 12.

While the compaction process illustrated in FIGS. 2 through 7 was described as dispensing the hard powder material before the soft powder material, those skilled in the art will appreciate that the order of filling is not critical. The soft powder material for the core 14 could be dispensed first by lowering the inner punch 26 instead of the outer punch 28 in FIG. 3. The shell 12 can then be formed by lowering the outer punch 28, and then either dispensing the hard powder material into the cavity 40, or placing preformed inserts of the desired permanent magnet material in the cavity 40. With either method, the compaction step would serve to physically bond the core 14 and shell 16 together. Another alternative is to use the compaction operation to form only the core 14, with preformed inserts of the permanent magnet material being assembled to the core 14 after the core is removed from the apparatus 20. Finally, while a uniaxial compaction technique is illustrated in FIGS. 2 through 7, it is foreseeable that isostatic compaction and dynamic magnetic compaction (DMC) methods could be used to form the core 14 and shell 16, as well as known extrusion and metal injection molding techniques.

Once the core 14 and shell 16 are formed, the assembly 10 (with or without the shaft 12) undergoes the partial sintering operation of this invention. Suitable temperatures for the partial sintering operation are those below the temperature at which the magnetic properties of the permanent magnet material degrades. For Nd—Fe—B compositions whose crystallization temperature is about 1620° F. (about 882° C.), a suitable partial sintering temperature is generally 1600° F. (about 870° C.) or less, preferably about 1400° F. to 1500° F. (from about 760° C. to about 830° C.), but most preferably at or just below 1500° F. According to this invention, the soft powder of the core 14 and the powder or insert of the permanent magnet material of the shell 12 are sufficiently fused at these temperatures to yield a rotor assembly that exhibits mechanical properties comparable to a fully sintered body (i.e., sintered at 2050° F. (about 1120° C.) or more), but without degrading the magnetic properties of the hard magnet region.

During an investigation leading to this invention, soft magnet powders from two different sources were compacted and then. partially sintered at various temperatures to assess the feasibility of a rotor with a soft magnet core and a hard magnet shell formed of a Nd—Fe—B permanent magnet material. The soft magnet powders were QMP 2570 ("Powder A") commercially available from Quebec Metal Powders, and Anchordense 45P ("Powder B") commercially available from Hoeganaes. Average particle size for both powders was about 100 micrometers. The powders were mixed with approximately equal amounts of the same lubricant, and then compacted at a temperature of about 175° C. and with a pressing force of about 50 tons per square inch (50 tsi, approximately 770 MPa) to form twenty-four specimens of each powder material. The specimens were then heated to either about 1300° F. (about 705° C.), 1400° F. (about 760° C.), 1500° F. (about 815° C.) or a conventional sintering temperature of about 2050° F. (about 1120° C.), for a duration of about sixty minutes. The specimens were then evaluated for density, tensile strength and percent elongation, the results of which are summarized in Table I below.

TABLE I

| SINTERING TREATMENT | PROPERTY | POWDER "A" | POWDER "B" |
| --- | --- | --- | --- |
| 1300° F. | Density (g/cc) | 7.441 | 7.327 |
| | Tensile (psi) | 31,820 | 12,180 |
| | % Elongation | 3.3 | 7.25 |
| 1400° F. | Density (g/cc) | 7.419 | 7.301 |
| | Tensile (psi) | 46,630 | 24,125 |
| | % Elongation | 7.7 | 7.25 |
| 1500° F. | Density (g/cc) | 7.518 | 7.427 |
| | Tensile (psi) | 59,635 | 43,510 |
| | % Elongation | 7.2 | 7.25 |
| 2050° F. | Density (g/cc) | n/a | 7.402 |
| | Tensile (psi) | n/a | 48,130 |
| | % Elongation | n/a | 3.0 |

The above results generally indicate that higher percent elongation was obtained with higher treatment temperatures. On the basis of these results, it can be seen that those specimens partially sintered at temperatures of 1400° F. and 1500° F. compared very favorably with those fully sintered at 2050° F. in terms of tensile strength and density, with the Powder A specimens treated at 1500° F. exhibiting better tensile strength than the sintered specimens of Powder B. From these results, it was concluded that a suitable lower temperature limit for the partial sintering operation of this invention is from 1400° F. to about 1500° F., with the preferred upper limit being up to 1500° F. It is foreseeable that higher temperatures could be used, up to the temperature at which the amorphous noncrystalline metallurgical structure and magnetic anisotropy of the permanent magnet materials are destroyed.

While the invention has been described in terms of a preferred embodiment, it is apparent that other forms could be adopted by one skilled in the art. Accordingly, the scope of the invention is to be limited only by the following claims.

What is claimed is:

1. A method of manufacturing a rotating electromagnetic body having regions of dissimilar magnetic properties, the method comprising the steps of:

compacting a soft magnet powder material and a permanent magnet material to form the rotating electromagnetic body containing at least one soft magnet region of the soft magnet powder material and at least one hard magnet region of the permanent magnet material, the soft magnet powder material having a sintering temperature at which particles of the soft magnet powder material fully sinter together, the permanent magnet material exhibiting magnetic anisotropy, having an amorphous noncrystalline metallurgical structure, and having a degradation temperature below the sintering temperature of the soft magnet powder material and at which permanent magnetic properties of the permanent magnet material are destroyed; and then partially sintering the rotating electromagnetic body at a temperature of less than the degradation temperature to at least partially fuse the soft magnet powder materials with the permanent magnet material so that the density of the rotating electromagnetic body is approximately equal to that of the rotating electromagnetic body if it were fully sintered.

2. The method according to claim 1, wherein the sintering temperature of the soft magnet powder material is at least 2050° F., and the rotating electromagnetic body is heated to a temperature of about 1400° F. to 1500° F. during the partial sintering step.

3. The method according to claim 1, further comprising the steps of:
  defining a first cavity corresponding to the soft magnet region of the rotating electromagnetic body;
  filling the first cavity with the soft magnet powder material;
  defining a second cavity corresponding to the hard magnet region of the rotating electromagnetic body; and then
  placing an insert of the permanent magnet material in the second cavity;
  wherein the compacting step causes both the soft magnet powder material to be compacted with the insert of the permanent magnet material, and wherein the partial sintering step causes at least partial fusing of the soft magnet powder material with the insert of the permanent magnet material.

4. The method according to claim 1, further comprising the steps of:
  defining a first cavity corresponding to the soft magnet region of the rotating electromagnetic body;
  filling the first cavity with the soft magnet powder material;
  defining a second cavity corresponding to the hard magnet region of the rotating electromagnetic body; and then
  filling the second cavity with a powder of the permanent magnet material;
  wherein the compacting step causes both the soft magnet powder material and the powder of the permanent magnet material to be compacted, and wherein the partial sintering step causes at least partial fusing of the soft magnet powder material with the powder of the permanent magnet material.

5. The method according to claim 4, wherein particles of the soft magnet powder material are encapsulated with an organic binder material, the organic binder material burning off during the partial sintering of the rotating electromagnetic body.

6. The method according to claim 4, wherein particles of the powder of the permanent magnet material are encapsulated with an organic binder material, the organic binder material burning off during the partial sintering of the rotating electromagnetic body.

7. The method according to claim 1, wherein the degradation temperature of the permanent magnet material is above 1600° F. and the sintering temperature of the soft magnet powder material is at least 2050° F.

8. The method according to claim 1, wherein the permanent magnet material has an amorphous noncrystalline metallurgical structure and exhibits magnetic anisotropy.

9. The method according to claim 1, wherein the soft magnet powder material is chosen from the group consisting of iron and alloys thereof, nickel and alloys thereof, cobalt and alloys thereof, iron-silicon alloys, iron-phosphorus alloys, iron-silicon-aluminum alloys, ferrites and magnetic stainless steel alloys.

10. The method according to claim 1, wherein the permanent magnet material is chosen from the group consisting of ferrites, iron-rare earth metal alloy, samarium alloys and ceramic materials.

11. The method according to claim 1, further comprising the step of inserting a shaft centrally within the rotating electromagnetic body prior to the partial sintering step, such that the partial sintering step causes at least partial fusing of the shaft to at least one of the soft magnet powder material and the permanent magnet material.

12. A method of manufacturing a rotating electromagnetic body having regions of dissimilar magnetic properties, the method comprising the steps of:
  forming a first cavity corresponding to a hard magnet region of the rotating electromagnetic body;
  filling the first cavity with a permanent magnet powder material whose individual particles have amorphous noncrystalline metallurgical structures that crystallize at a crystallization temperature above 1600° F.;
  forming within the first cavity a second cavity corresponding to a soft magnet region of the rotating electromagnetic body;
  filling the second cavity with a soft magnet powder material having a sintering temperature at which particles of the soft magnet powder material fully sinter together, the sintering temperature being above the crystallization temperature of the permanent magnet powder material;
  compacting the soft and permanent magnet powder materials to form the rotating electromagnetic body containing the soft and hard magnet regions; and then
  partially sintering the rotating electromagnetic body at a temperature above 1400° F. up to 1500° F. to at least partially fuse the soft and permanent magnet powder materials so that the density of the rotating electromagnetic body is approximately equal to that of the rotating electromagnetic body if it were fully sintered.

13. The method according to claim 12, wherein particles of the soft magnet powder material are encapsulated with an organic binder material, the organic binder material burning off during the partial sintering of the rotating electromagnetic body.

14. The method according to claim 12, wherein particles of the permanent magnet powder material are encapsulated with an organic binder material, the organic binder material burning off during the partial sintering of the rotating electromagnetic body.

15. The method according to claim 12, wherein particles of the permanent magnet powder material are not encapsulated and exhibit magnetic anisotropy.

16. The method according to claim 12, wherein particles of the permanent magnet powder material exhibit magnetic anisotropy.

17. The method according to claim 12, wherein the sintering temperature of the soft magnet powder material is at least 2050° F., and the soft magnet powder material is chosen form the group consisting of iron and alloys thereof, nickel and alloys thereof, cobalt and alloys thereof, iron-silicon alloys, iron-phosphorus alloys, iron-silicon-aluminum alloys, ferrites and magnetic stainless steel alloys.

18. The method according to claim 12, wherein the permanent magnet powder material is chosen from the group consisting of ferrites, iron-rare earth metal alloys, samarium alloys and ceramic materials.

19. The method according to claim 12, further comprising the steps of:
  prior to the compacting step, defining a third cavity coaxial with a central axis of the rotating electromagnetic body; and then
  inserting a shaft within the third cavity, such that the compacting and partial sintering steps cause at least partial fusing of the shaft to at least one of the soft magnet powder material and the permanent magnet material.

20. A method of manufacturing a magnet rotor, the method comprising the steps of:

defining a first annular cavity about an axis, the first annular cavity having an inner perimeter and an outer perimeter;

defining a first annular cavity about an axis, the first annular cavity having an inner perimeter and an outer perimeter;

filling the first annular cavity with a soft magnet powder material having a sintering temperature of at least 2050° F., the soft magnet powder material being chosen from the group consisting of iron and alloys thereof, nickel and alloys thereof, cobalt and alloys thereof, iron-silicon alloys, iron-phosphorus alloys, iron-silicon-aluminum alloys, ferrites and magnetic stainless steel alloys, individual particles of the soft magnet powder material being encapsulated with a binder material;

defining a second annular cavity concentric with and surrounding the first annular cavity, the second annular cavity having an inner perimeter defined by the outer perimeter of the first annular cavity and an outer perimeter corresponding to an outer perimeter of the magnet rotor, filling the second annular cavity with a permanent magnet powder material chosen from the group consisting of iron and alloys thereof, nickel and alloys thereof, cobalt and alloys thereof, iron-silicon alloys, iron-phosphorus alloys, iron-silicon-aluminum alloys, ferrites and magnetic stainless steel alloys, individual particles of the permanent magnet powder material exhibiting magnetic anisotropy derived from an amorphous noncrystalline metallurgical structure that crystallizes at a temperature above 1600° F.;

heating the soft and permanent magnet powder materials while compacting the soft and permanent magnet powder materials in a direction parallel to the axis of the first annular cavity so as to form the magnet rotor; and then partially sintering the magnet rotor at a temperature above 1400° F. up to 1500° F. to at least partially fuse the soft and permanent magnet powder materials so that the density of the magnet rotor is approximately equal to that of the magnet rotor if it were fully sintered.

* * * * *